March 14, 1939. F. R. ZIMMERMAN 2,150,755
SPRING COUPLING MACHINE
Filed Oct. 28, 1937 5 Sheets-Sheet 1

Inventor:
Fred R. Zimmerman
By: Rudolph Mu Lotz
Attorney.

March 14, 1939.     F. R. ZIMMERMAN     2,150,755
SPRING COUPLING MACHINE
Filed Oct. 28, 1937     5 Sheets-Sheet 4

Inventor:
Fred R. Zimmerman,
By: Rudolph M. Lotz
Attorney.

March 14, 1939.  F. R. ZIMMERMAN  2,150,755
SPRING COUPLING MACHINE
Filed Oct. 28, 1937   5 Sheets-Sheet 5
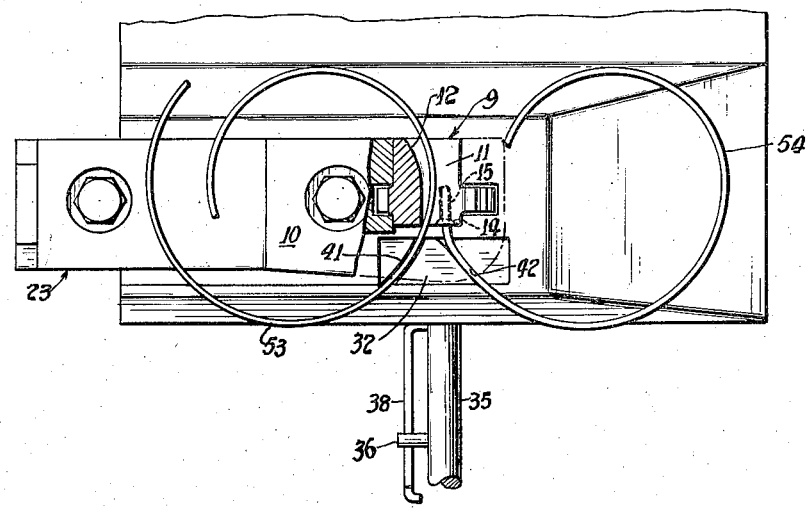
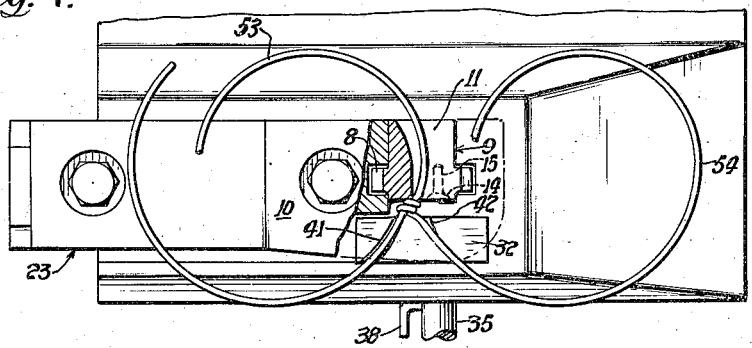
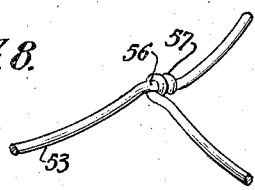
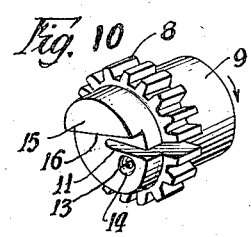
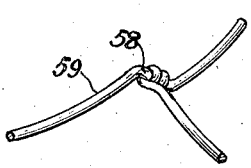
Inventor:
Fred R. Zimmerman
By: Rudolph [signature]
Attorney.

Patented Mar. 14, 1939

2,150,755

UNITED STATES PATENT OFFICE 2,150,755

SPRING COUPLING MACHINE

Fred R. Zimmerman, Chicago, Ill., assignor to Nachman Springfilled Corporation, Chicago, Ill., a corporation of Illinois Application October 28, 1937, Serial No. 171,489

6 Claims. (Cl. 140—101)

The present invention has for its object to provide a machine for coupling upholstery springs with each other by knotting or coiling extremities of one of said springs to the terminal coils of an adjacent spring or springs to produce articulate rows of said springs preparatory to coupling the several rows with each other in the production of spring assemblies for mattresses and cushions, such as are described and claimed in the patent to Oliver Hetherington No. 1,888,666, and wherein the mechanism for effecting the knotting or coiling of such terminal ends of one spring to other springs is so accomplished as to maintain the terminal coils of all springs of a row thereof in substantially the same parallel horizontal planes with a great degree of accuracy.

A further object of the invention is to provide a machine of the type described wherein the terminal coil of the spring about which the extremity of an adjacent spring is to be knotted is bent automatically to provide an offset in said terminal coil which extends angularly to the remainder of the coil in the horizontal plane of the latter about which the extremity of the adjacent spring is coiled and whereby creeping of the coil formed about said offset portion and engagement with the latter is prevented, thereby to maintain all of the springs of a row produced by the machine permanently in predetermined relative positions.

A further object of the invention is to provide simple and efficient means for accomplishing the aforesaid objects of the invention and to so construct the machine as to render the same durable and efficient.

A suitable embodiment of the present invention is illustrated in the accompanying drawings, wherein—

Fig. 6 is a fragmentary detail plan section of the machine on the line 6—6 of Fig. 2, showing terminal portions of a pair of springs positioned in the mechanism preparatory to joining them.

Fig. 7 is a view similar to Fig. 6 showing the springs immediately following the knotting operation.

Fig. 8 is a fragmentary, perspective view showing the offset in one of the springs and the coil or knotting of the other springs disposed about said offset.

Fig. 9 is a view similar to Fig. 8 showing the downwardly projecting offset as produced by the machine of the Gilmore Patent No. 2,058,679.

Fig. 10 is a perspective view of the coiling head of the machine.

Figure 1:
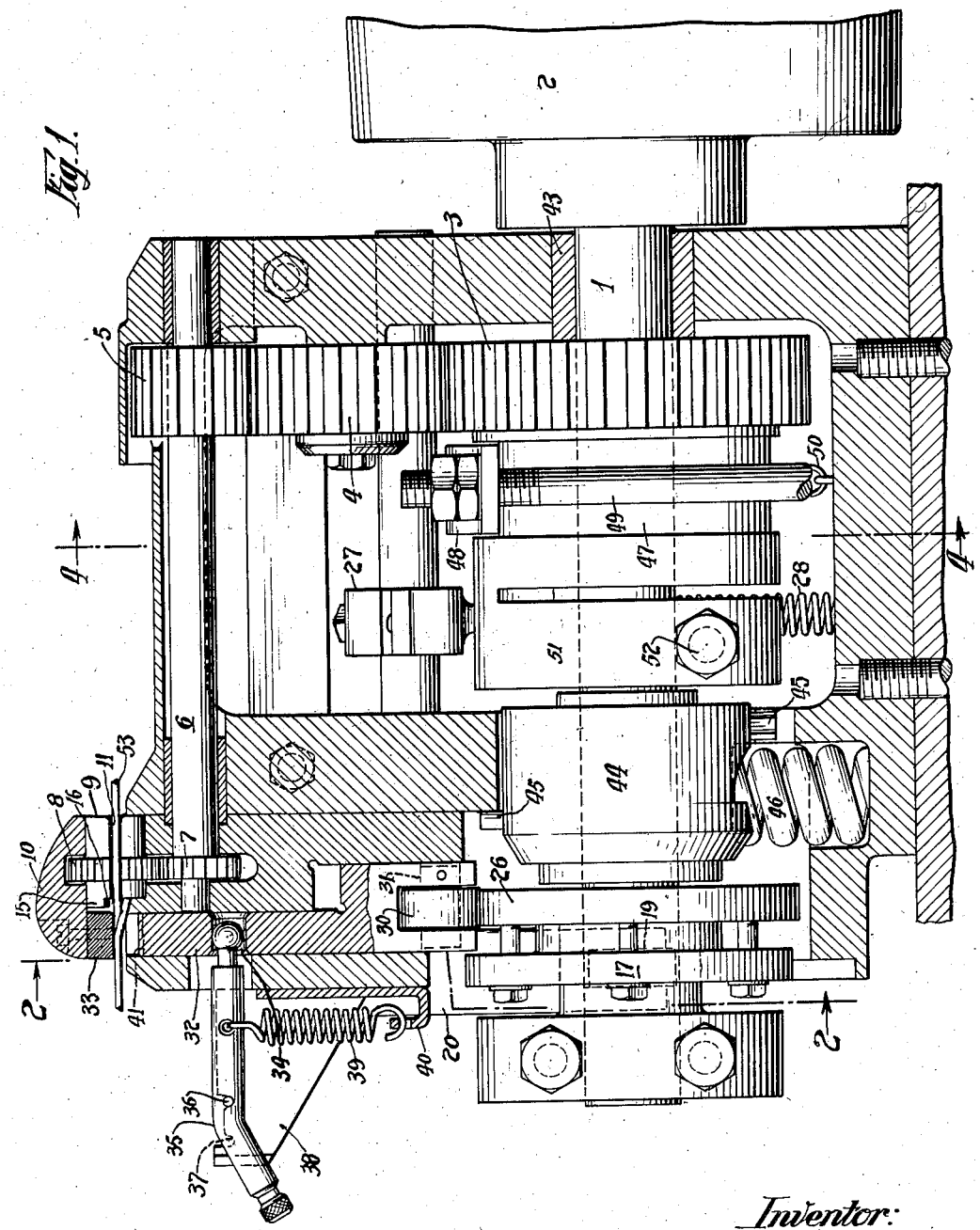
Fig. 1 is a central, vertical, longitudinal, sectional view partly in elevation of a machine constructed in accordance with the invention.

The machine of the present invention constitutes an improvement in the machine which is the subject matter of Letters Patent to Chace D. Gilmore No. 2,058,679.

The machine comprises a suitable frame which is equipped with bearings for the drive shaft 1 actuated by a conventional punch press clutch mechanism of which the member 2 constitutes a part and which acts, when tripped in the conventional manner, to effect one complete revolution of said shaft 1.

Loosely mounted upon said shaft 1 is a spur gear wheel 3 which meshes with a spur gear wheel 4 on a stud shaft rigid with the machine frame and said gear wheel 4 meshes, in turn, with a spur gear wheel 5 mounted upon a countershaft 6 journalled in bearings in the upper portion of the frame. Said shaft 6 is rigid with a spur gear wheel 7 which meshes with a spur gear element 8 integral with what is termed a coiling head 9 of the machine.

Said coiling head 9 is illustrated in Fig. 10 as comprising a cylindrical body portion indicated by the numeral 9 projecting beyond a side of the gear element 8 and which is journalled in bearings in the head 10 at the rear end of the machine frame. Said head is equipped with a radial slot 11, the inner wall of which is arcuate and is concentric with its axis, the one end of said slot having a curved rear wall and being of greater depth than the other end portion of said slot as indicated at 12 in Fig. 6.

Below said slot 11, the said head is provided with an opening 13 parallel with its axis and extending an appreciable depth into said head, said opening being equipped with a flared or countersunk mouth 14.

On the opposite side of said slot 11, said head is equipped with a projection 15 presenting a flat shoulder 16 which is substantially parallel with the slot 11 and is spaced from the latter a distance substantially equal to the diameter or gauge of the wire of which the springs to be operated upon are composed. The said heads 9 for operation upon springs composed of different gauges of wire are interchangeable with each other as required.

Figure 2:
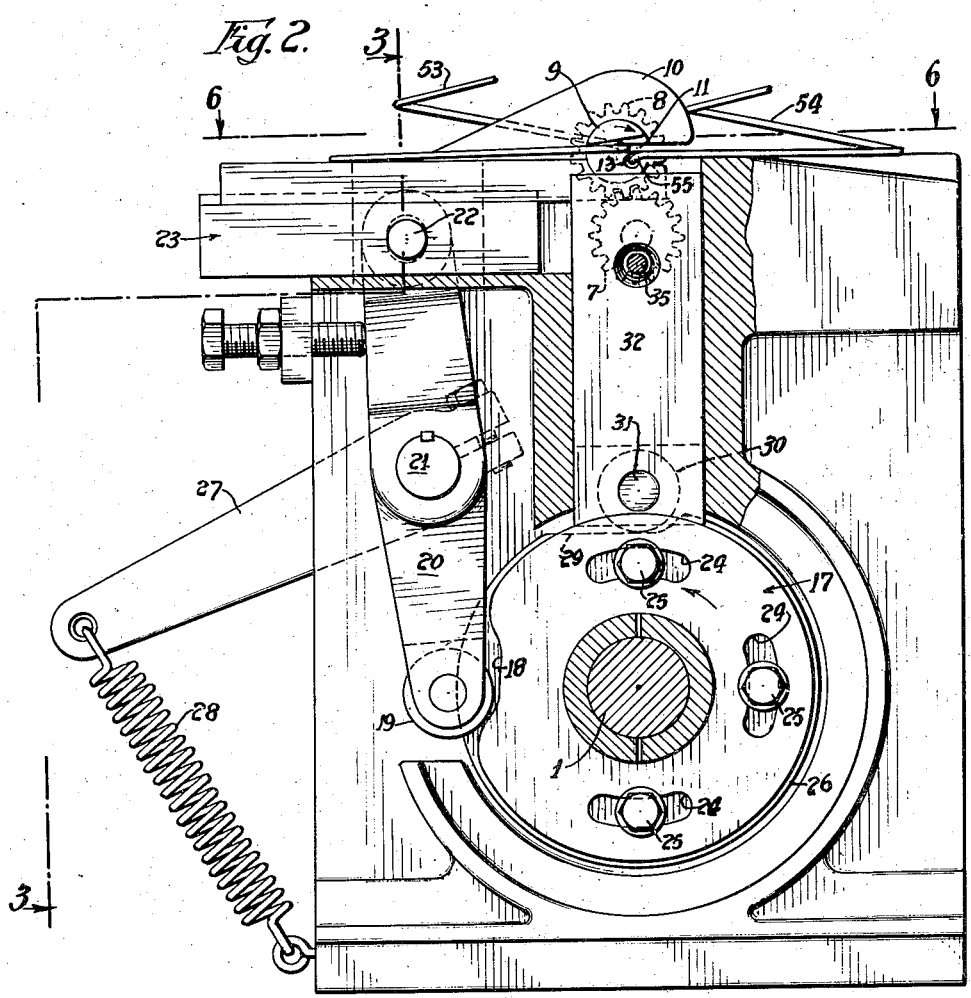
Fig. 2 and Fig. 4 are, respectively, vertical transverse sections of the machine taken on the lines 2—2 and 4—4, respectively, of Fig. 1.
Figure 3:
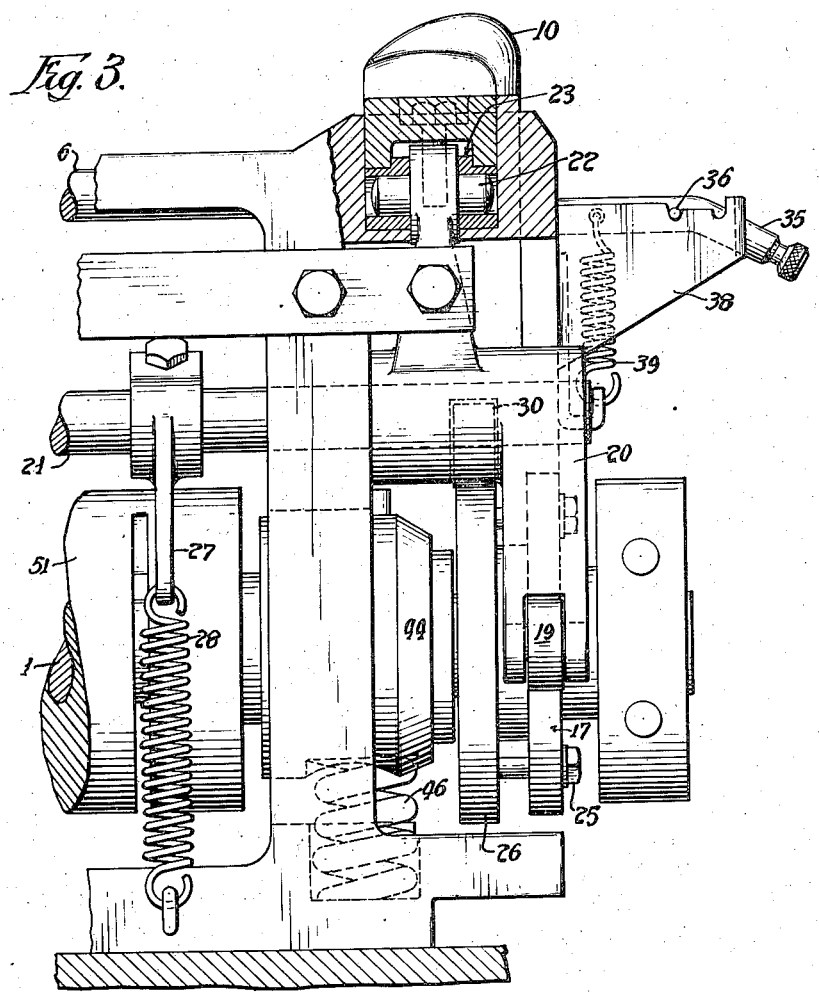
Fig. 3 is a fragmentary side elevation of the machine partly in section on the line 3—3 of Fig. 2, illustrating certain details of the knotting or coiling mechanism of the machine.

Rigid with the shaft 1 is a cam 17 having a cylindrical surface except for the recess 18 therein, in which the anti-friction roller 19 of a lever 20 engages, said lever being partially mounted between its ends upon a stud shaft 21 of the frame of the machine, and which, at its upper end is pivotally secured by means of the pin 22 with the slidable plunger 23 which carries the head 10 and the said coiling head 9, as shown in Fig. 2. The said cam 17 is equipped with a plurality of arcuate slots 24 through which adjusting screws 25 project and which engage in a disk 26 mounted upon the shaft 1 whereby the said cam may be adjusted arcuately to vary the position of the recess 18 as may be required.

Rigidly secured to the said lever 20 is an arm 27 which is engaged with one end of a tension spring 28 secured at its other end to the machine frame, whereby to maintain the roller 19 normally in engagement with the surface of said cam 17.

The said disk 26 also constitutes a cam member having a cylindrical surface which is cut away as shown in full and dotted lines at 29 in Fig. 2 and which engages the anti-friction roller 30 mounted upon a stud shaft 31 carried by a vertically reciprocable plunger 32 which constitutes one element of a wire clamping device of the machine. The other of the clamping members with which the plunger 32 cooperates consists of a block 33 which is mounted in the head 10 shown in Fig. 1. The said plunger 32 is provided between its ends with an opening 34 into which one end of a lever 35 projects, said lever being equipped with a cross pin 36 engaged in either of two recesses 37 of a bracket 38 mounted upon one end of the machine and which is maintained normally in a position to cause said plunger 32 to be disposed at the lower limit of its movement by means of the tension spring 39 secured to said lever 35 between said pin 36 and the end portion projecting into said opening of said plunger and is also secured at its lower end to a bracket element 40 mounted upon the machine frame. In the upper end of the plunger there are two arcuate slots 41 and 42, respectively, in which the terminal coils of two springs to be coupled with each other are engaged, said recesses being of less depth than the gauge of the wire of which said springs are composed, so that when said plunger 32 is disposed at the upper limit of its movement, the portions of the springs opposed to the clamping block 33 will be engaged with the latter.

The main bearing 43 for the shaft 1 is capable of effecting a slight rocking movement relatively to the machine frame and the other bearing 44 for said shaft may be termed a floating bearing which is held against rotation by means of a pin or pins 45 and engage in a rigid part of the machine frame, said bearing being supported and held in its normal position by means of a heavy companion spring 46, the purpose of which is to enable the cams 17 and 26 to accommodate themselves yieldingly to undue stresses resulting from misplacement of springs with respect to the recesses 41 and 42 of the plunger 32 or which may result from jamming of wire in or adjacent to the coiling head 9 during the operation of the machine, the main object of said spring 46 being to relieve the stress on the head 10 resulting from such misplacements or jamming and preventing breakage of said head.

Figure 4:
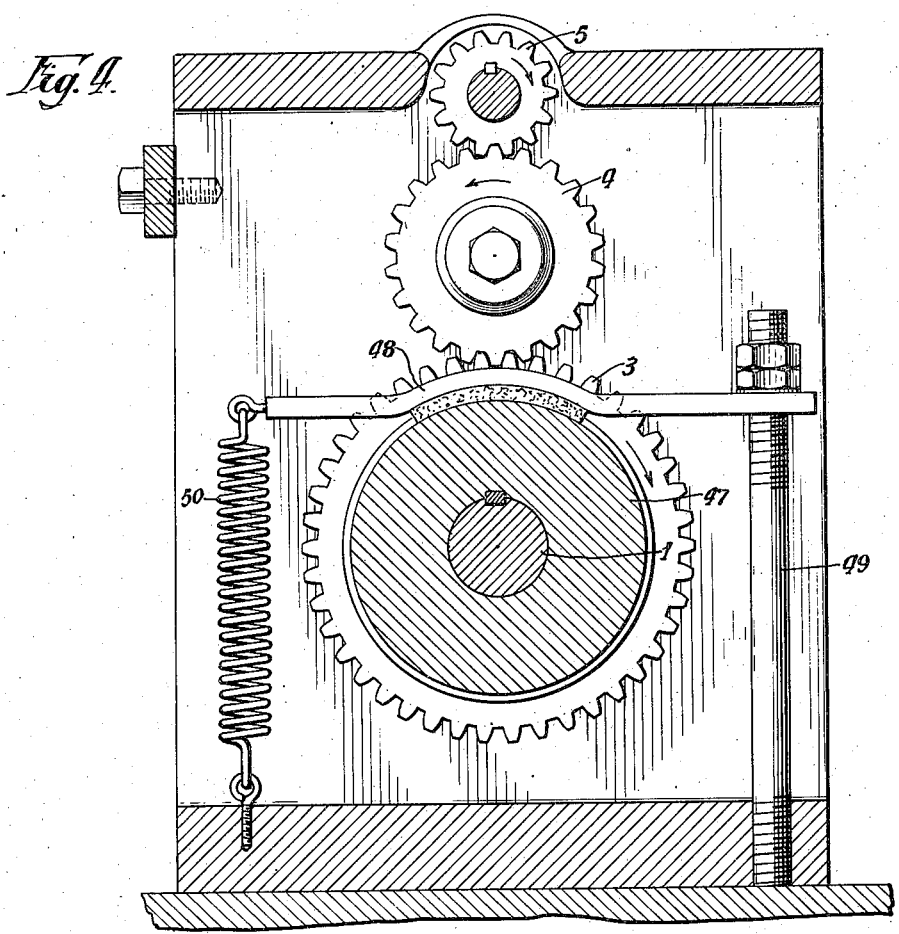
Figure 5:
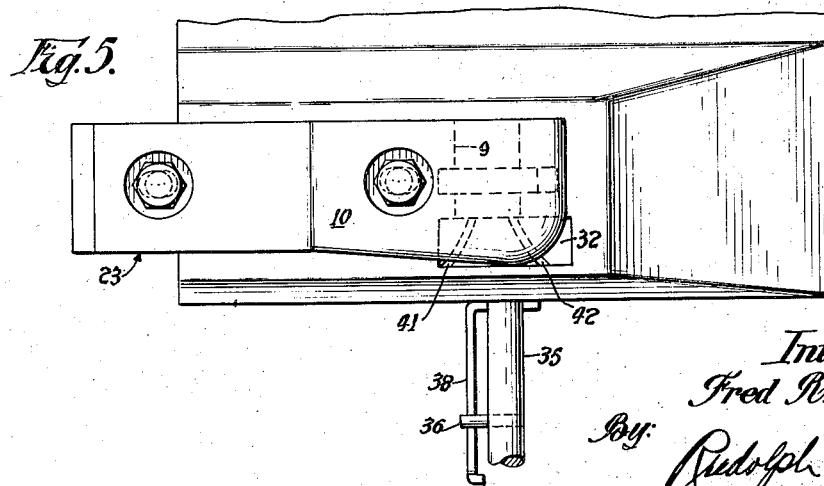
Fig. 5 is a fragmentary top plan view of the left hand end of the machine.

Also rigid with said shaft 1 is a brake disk 47 which is engaged by a brake shoe 48 which is secured at one end to a rod 49 rigid with the machine frame and at its other end is engaged with a tension spring 50 (Fig. 4).

Said brake disk is integral with a member 51 clamped against rotation relatively to the shaft by means of a bolt or set screw 52.

The purpose of the brake shoe or brake mechanism last-above described is to prevent the coiling head 9 from being rotated to a greater extent than a predetermined number of complete revolutions at each complete rotation of the shaft 1 as may be determined by the gear ratio between said shaft 1 and said coiling head 9.

The reciprocable plunger 23 which carries the head 10 and the said coiling head 9 is moved forward immediately upon the beginning of rotation of the cam 17 and at the same instant the plunger 32 begins its upward movement. Preceding the actuation or tripping of the punch press clutch, the operator of the machine places a spring 53 in the machine so that its terminal coil lies within the slot 11 of the head 9 and so that said terminal coil rests also in the recess 41 of the plunger 32. The operator then places a companion spring 54 so that its lower extremity 55 projects into the opening 13 of the head and an adjacent portion of said terminal end portion of said lower end coil of said companion spring 54 rests in the recess 42 of the plunger 32. When the springs 53 and 54 are in the position shown in detail in Fig. 6, the punch press plunger is tripped and causes the plunger 32 to be actuated to move upwardly to clamp the springs against the block 33. Following this movement of said plunger 32 and after the same is completed, the anti-friction roller on the lever 20 will be engaged with the shoulders of the cam 17 at the far end of the recess in said cam 17 which then causes said lever 20 to swing in the direction to cause the plunger 23 to move to the right. This causes the portion of the spring 53 spanning the space between the coiling head 9 and the plunger 32 to be bent to provide an offset 56 about which the extremity of the spring 54 is coiled during the rotation of the head 9.

At the same instant, substantially, that the foregoing operations occur, the rotation of the coiling head begins and during such rotation the end of the spring 54 engaged in the opening 13 of the head 9 will be carried over and around the said offset 56 and at the same time said terminal portion of the spring 54 which is engaged in said opening 13, will gradually be withdrawn from said opening during further rotation of said head 9 and when entirely withdrawn from said opening, the remaining portion of said terminal end of spring 54 will be engaged by the shoulder 16 of the projection 15 of said coiling head 9 to complete the coiling operation which is termed commonly in the art as a "knotting" operation, the coil or knot 57 thus formed being entirely about the offset 56 as heretofore described.

The said offset 56 is effected at a sufficiently sharp angle to the next adjacent portions of the spring 53 to prevent the coil 57 from creeping out of engagement with the offset 56 and around said adjacent portions of said spring.

When the foregoing knotting operation has been completed, the coiling head will have completed its cycle of complete revolutions and is restored to its normal position with its slot 11 disposed substantially in a horizontal plane.

The portion of the spring 53 which is then disposed within the slot 11 is moved to the right and thence over the head 10 and thereupon the two springs are moved to the left until the desired portion of the lower terminal coil of the spring 54 is positioned in the slot 11 of the coiling head previously occupied by the spring 53 and another spring 54 is then positioned relatively to the first-mentioned spring 54 as illustrated in Fig. 6.

In the case of the machine of the Gilmore Patent No. 2,058,679, the coiling head corresponding substantially with the head 9 of the present machine, is stationary as opposed to having a movement in a plane substantially horizontal and the clamping mechanism of said Gilmore machine operates to provide an offset 58 in the terminal coil of the spring 59 which corresponds to spring 53, which is disposed in a vertical plane instead of a horizontal plane as in the instant machine. This offset has been relatively sharp and causes the resulting spring assembly to present pad supporting surfaces which are irregular and distorted in comparison with the spring assembly resulting from the use of the instant machine wherein only the coil 57 projects slightly upwardly and downwardly, respectively, from the horizontal plane of the top and bottom surfaces of the said assembly.

Obviously, at the instant that the coiling head 9 is restored to its normal position, the cams 17 and 26 will also be restored to their initial position.

Inasmuch as certain of the details of construction of the present machine are substantially identical with that of the machine of the aforesaid Gilmore patent, particular description thereof has been omitted, thus, for example, floating bearing 43 for the shaft 1 will be mounted in the machine frame in substantially the same manner as is the bearing 70 for the Gilmore shaft 22, of the machine of said Gilmore patent, as shown in Fig. 23 of the latter. Furthermore, the bearing 44 for shaft 1 of the instant machine may be mounted and held against rotation in substantially the same manner as the bearing 72 illustrated in Fig. 22 of said Gilmore patent.

I claim as my invention:

1. A machine for the purpose specified comprising a rotatable coiling head arranged to receive and rotate about a terminal coil of a spring, an opening in one end of said head adapted to receive an end portion of the terminal coil of another spring, means disposed adjacent to and spaced from the last-mentioned end of said head for engaging portions of the terminal coils of both said springs to maintain the same in predetermined relative positions, mechanism for imparting relative movement to said first-named means and said head for bending the portion of the first-named spring spanning the space between said means and said head, a shoulder on the last-named end of said head for engaging the terminal portion of the second-named spring as the latter is withdrawn from said opening during the rotation of said head for effecting coiling of said end portion about the bent portion of the other spring for completing the coiling operation, and power actuating means common to said head and said first-named means, and mechanism for actuating the same in predetermined order of succession.

2. A machine for the purpose specified comprising a rotatable coiling head arranged to receive and rotate about a terminal coil of a spring, mechanism for rotating said head through a predetermined number of revolutions at selected intervals, an opening in one end of said head adapted to receive an end portion of the terminal coil of another spring, means disposed adjacent to and spaced from the last-mentioned end of said head for engaging portions of the terminal coils of both said springs to maintain the same in predetermined relative positions, means for imparting relative movement to said first-named means and said head for bending the portion of the first-named spring spanning the space between said means and said head, a shoulder on the last-named end of said head for engaging the terminal portion of the second-named spring as the latter is withdrawn from said opening during the rotation of said head for effecting coiling of said end portion about the bent portion of the other spring for completing the coiling operation, said several respective means being actuated by said mechanism in predetermined order of succession.

3. A machine of the type specified comprising a rotatable coiling head equipped with a radial slot adapted to receive a portion of a coil of a spring about which said head is rotatable, said head equipped at one end and at one side of said slot with a projection and at the other side of said slot with an opening parallel with the axis of said head and adapted to receive a predetermined length of the terminal portion of another spring, a clamping device opposed to and spaced from the said end of said head for engaging predetermined portions of both said springs, means for imparting a relative movement to said head and said clamping device in the plane of the slot in said head for bending the portion of the first-named spring spanning the space between said device and said head, and power mechanism common to said head, said device and said means for actuating said clamping device, and said means then rotating said head through a predetermined number of complete revolutions in the order of succession set forth whereby to cause said head and the projection thereon to coil the terminal end portion of the second-named spring about the bent portion of the first-named spring.

4. A machine of the type specified comprising a rotatable coiling head equipped with a radial slot adapted to receive a portion of a coil of a spring about which said head is rotatable, said head equipped at one end and at one side of said slot with a projection and at the other side of said slot with an opening parallel with the axis of said head and adapted to receive a predetermined length of the terminal portion of another spring, a clamping device opposed to and spaced from the said end of said head for engaging predetermined portions of both of said springs, a supporting surface for the main portion of the second-named spring arranged for cooperation with said clamping device to maintain the terminal coils of both said springs in substantially the plane of the slot in said head, means for imparting a relative movement to said head and said clamping device in the plane of the slot in said head for bending the portion of the first-named spring spanning the space between said device and said head, and power mechanism common to said head, said device, and said means for actuating said clamping device, and said means and then rotating said head through a predetermined number of complete revolutions in the order of succession set forth whereby to cause said head and the projection thereon to coil the terminal end portion of the second-named spring about the bent portion of the first-named spring.

5. A machine of the type specified comprising a rotatable coiling head equipped with a radial slot adapted to receive a portion of a coil of a spring about which said head is rotatable, said head equipped at one end and at one side of said slot with a projection and at the other side of said slot with an opening parallel with the axis of said head and adapted to receive a predetermined length of the terminal portion of another spring, a clamping device opposed to and spaced from the said end of said head for engaging predetermined portions of both said springs, means for moving said head in substantially the plane and in the direction of the mouth of said slot for bending the portion of the coil of the first-named spring spanning the space between said head and said clamping device, and power mechanism common to said head, said device and said means for actuating said clamping device, and said means and then rotating said head through a predetermined number of complete revolutions in the order of succession set forth whereby to cause said head and the projection thereon to coil the terminal end portion of the second-named spring about the bent portion of the first-named spring.

6. A machine for the purpose specified comprising a rotatable coiling head equipped with a radial slot normally disposed in a given plane and adapted to receive and rotate about a portion of a terminal coil of a spring, a shoulder on one end of said head substantially parallel with and spaced from said head on the opposite side of said slot from said shoulder which is adapted to receive a predetermined length of the terminal portion of the terminal coil of another spring, a support for the latter to maintain said terminal coil thereof susbtantially in the plane of said slot, a clamping device opposed to and spaced from said last-named end of said head for engaging portions of the terminal coils of both springs and cooperating with said support and said slot to maintain the terminal coil of the first-named spring aligned with the terminal coil of the second-named spring, means for imparting a relative movement to said head and said clamping device in substantially the plane of said slot for effecting bending of the first-named coil at spaced apart points to provide a portion thereof spanning the space between said head and said clamping device extending angularly to the adjacent portions of said coil, and power mechanism common to said head, said device and said means for actuating said clamping device, and said means and then rotating said head through a predetermined number of complete revolutions in the order of succession set forth whereby to cause said head and the projection thereon to coil the terminal end portion of the second-named spring about the bent portion of the first-named spring.

FRED R. ZIMMERMAN.